US007658215B2

(12) United States Patent
Chapman

(10) Patent No.: US 7,658,215 B2
(45) Date of Patent: Feb. 9, 2010

(54) METHOD OF OPERATING A WOOD CHIPPER AND POWER TRANSMISSION SYSTEM FOR USE THEREWITH

(75) Inventor: Bruce G. Chapman, Wooster, OH (US)

(73) Assignee: Rayco Manufacturing, Inc., Wooster, OH (US)

( * ) Notice: Subject to any disclaimer, the term of this patent is extended or adjusted under 35 U.S.C. 154(b) by 652 days.

(21) Appl. No.: 11/177,199

(22) Filed: Jul. 8, 2005

(65) Prior Publication Data

US 2007/0034295 A1 Feb. 15, 2007

(51) Int. Cl.
*B23Q 15/00* (2006.01)
*B23Q 16/00* (2006.01)

(52) U.S. Cl. ........................ 144/356; 144/392; 144/404

(58) Field of Classification Search ................. 144/356, 144/373, 382, 392, 394, 162.1, 402, 404; 241/92

See application file for complete search history.

(56) References Cited

U.S. PATENT DOCUMENTS 5,050,554 A * 9/1991 Ichikawa ............... 123/406.27
6,000,642 A * 12/1999 Morey ......................... 241/34
6,290,155 B1 * 9/2001 Thompson et al. ............ 241/92
6,814,320 B1 11/2004 Morey et al.
6,830,204 B1 12/2004 Morey
2002/0139877 A1 * 10/2002 Beam, III .................. 241/37.5

* cited by examiner

*Primary Examiner*—Shelley Self
(74) *Attorney, Agent, or Firm*—Sand & Sebolt

(57) ABSTRACT

A wood chipper includes a control system for controlling feed wheel rotation and engine operation to provide safety features and a fuel-saving mechanism. The control system allows the engine to start only when the feed wheel is in neutral; stops and/or reverses rotation of the feed wheel in response to an increased load on the engine; and dethrottles the engine if the feed wheel remains in neutral for a predetermined period of time. A pair of electric switches are activatable by the feed bar whereby an electronic control unit (ECU) can determine the position of the feed bar based on activation or non-activation of the switches and control the feed wheel and engine in light thereof. The ECU controls a pair of directional control valves via respective solenoids to control flow of hydraulic fluid to control rotation of a feed motor which drives the feed wheel.

10 Claims, 9 Drawing Sheets

METHOD OF OPERATING A WOOD CHIPPER AND POWER TRANSMISSION SYSTEM FOR USE THEREWITH

BACKGROUND OF THE INVENTION

1. Technical Field

The invention relates generally to wood chippers. More particularly, the invention relates to a control system for controlling the feed of material into the wood chipper and the operation of the engine of the wood chipper. Specifically, the invention relates to such a control system which includes an engine-starting safety mechanism, a fuel-saving mechanism and a mechanism for automatically stopping or reversing the feed mechanism in response to an increased load upon the engine.

2. Background Information

Typically, wood chippers include an engine for powering a chipper and a hydraulic system for rotating a feed wheel which feeds wood material and the like into the wood chipper where the material is cut by a cutting assembly housed within the chipper. Safety regulations require that wood chippers have a feed control bar which runs along the top and sides of the feed chute of the wood chipper so that operators may easily control the direction of the feeding material by controlling the rotation of one or more feed wheels. The feed control bars typically have a forward feed position, a neutral position and a reverse feed position. Typically, the feed control bar actuates a directional control valve which directs hydraulic fluid to one or more feed motors to rotate the motors in a forward or reverse direction. This actuation is accomplished by linkages which are often fragile, hard to adjust and subject to wear and abuse. In addition, these traditional systems do not allow for automatic starting, stopping or reversing of the feed wheels. Instead, the operator must move the feed control bar to control the feed wheels. Dump valves have been added to allow an electronic control unit (ECU) to dump hydraulic fluid whenever the operational speed of the engine becomes too low. In addition, reversing valves have been added to allow the ECU to reverse the hydraulic flow to the feed motors. However, the wood chippers having these additions present a variety of poorly configured linkages and too many hydraulic valves and hoses. U.S. Pat. No. 6,830,204 granted to Morey discloses a reversing automatic feed wheel assembly for a wood chipper wherein an ECU controls a reversing valve in order to reverse the direction of the feed wheel in response to a reduced speed of or excessive load placed on the cutting assembly or engine of the wood chipper. However, said patent provides only for automatic reversal and subsequent automatic forward rotation of the feed wheel without the ability to maintain the feed wheel in a stopped or non-rotating state in response to an increased load on the cutting assembly or engine. In addition, the known prior art fails to provide a control system which allows a variety of functions related to controlling the feed wheel and the engine of the wood chipper. The present invention provides such a control system.

BRIEF SUMMARY OF THE INVENTION

The present invention provides a method comprising the steps of sensing via at least one electric switch a position of a feed control bar of a wood chipper; and controlling with an electronic control unit (ECU) in light of the position of the feed control bar one of rotational movement of a feed wheel of the wood chipper and operation of an engine which selectively powers the wood chipper.

The present invention also provides a wood chipper comprising a feed wheel; at least one electric switch associated with rotating the feed wheel; a feed control bar for activating the at least one switch; and an electronic control unit (ECU) in electrical communication with the at least one switch wherein the ECU is capable of determining a position of the feed control bar based on activation or inactivation of the at least one switch.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
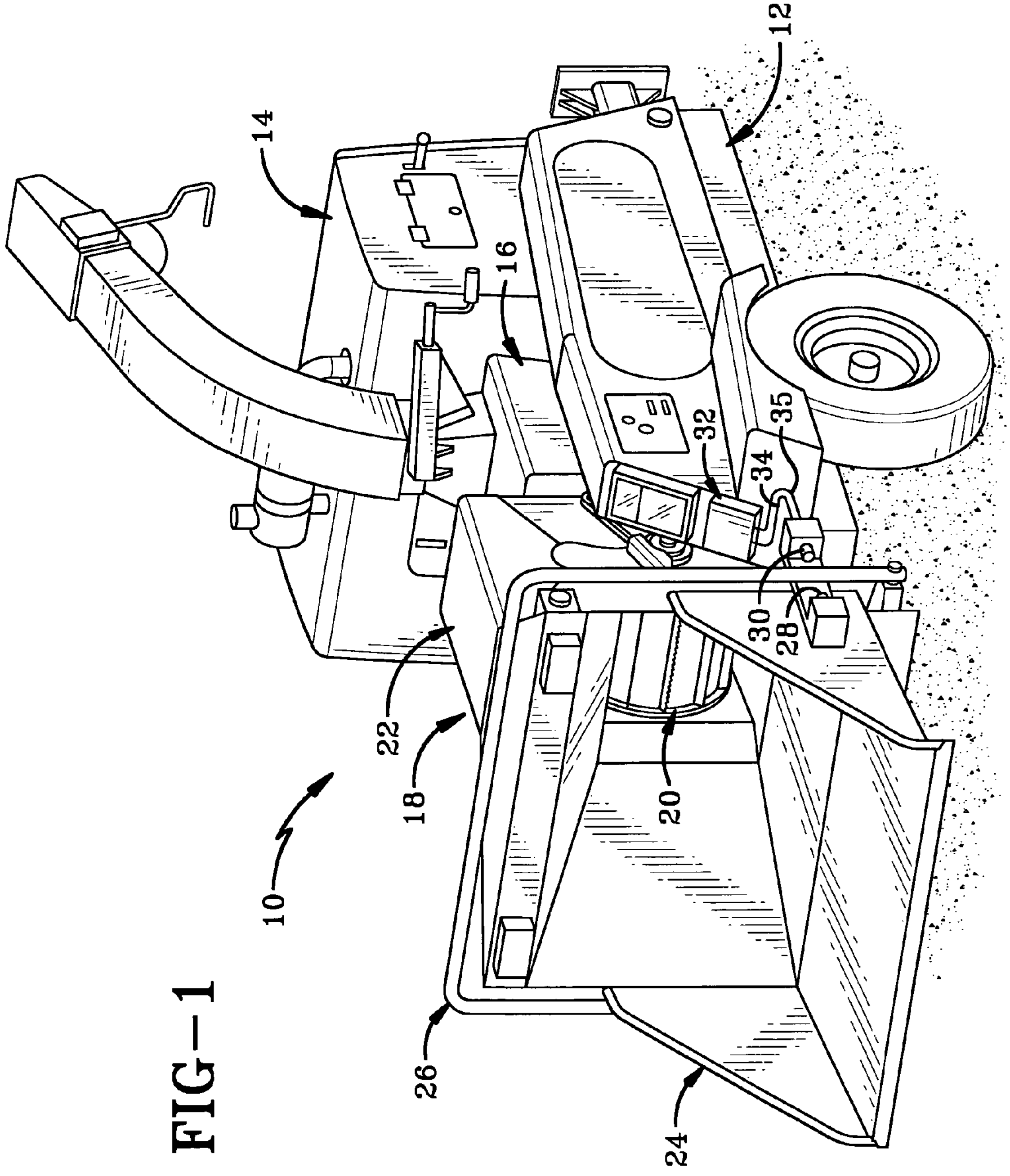
FIG. 1 is a perspective view of the wood chipper of the present invention.

The wood chipper of the present invention is indicated generally at 10 in FIG. 1. Wood chipper 10 is configured with a control system providing several advantages. First, the control system prevents the starting of the wood chipper unless the feed mechanism for feeding materials into the chipper is in a neutral state. Second, the control system provides for the automatic stopping and/or reversing of the feed mechanism in response to an increased load upon the wood chipper. Third, the control system provides for a fuel-saving mechanism wherein the operational speed of the engine is decreased when the feed mechanism remains in a neutral state for a predetermined amount of time.

Wood chipper 10 is a wheeled vehicle having a frame 12 with an engine 14 mounted thereon. A cutting assembly 16 is mounted on frame 12 and is operatively connected to engine 14. A feed wheel assembly 18 is mounted on frame 12 adjacent cutting assembly 16 and opposite engine 14. Feed wheel assembly 18 includes a feed wheel 20 rotatably mounted within a feed wheel housing 22. A feed chute 24 is mounted adjacent feed wheel housing 22 whereby feed material may be fed through feed chute 24 into housing 22 and be drawn by feed wheel 20 into cutting assembly 16. A feed control bar 26 is rotatably mounted on frame 12 adjacent feed chute 24. First and second (forward and reverse) electric switches 28 and 30 are mounted adjacent feed control bar 26 on opposite sides thereof and are contactable via feed control bar 26 upon movement thereof in the respective directions of said switches. An electronic control unit (ECU) 32 having a logic circuit is mounted on frame 12 and is in electrical communication with switches 28 and 30 via respective electrical circuits 34 and 35.

Figure 2:
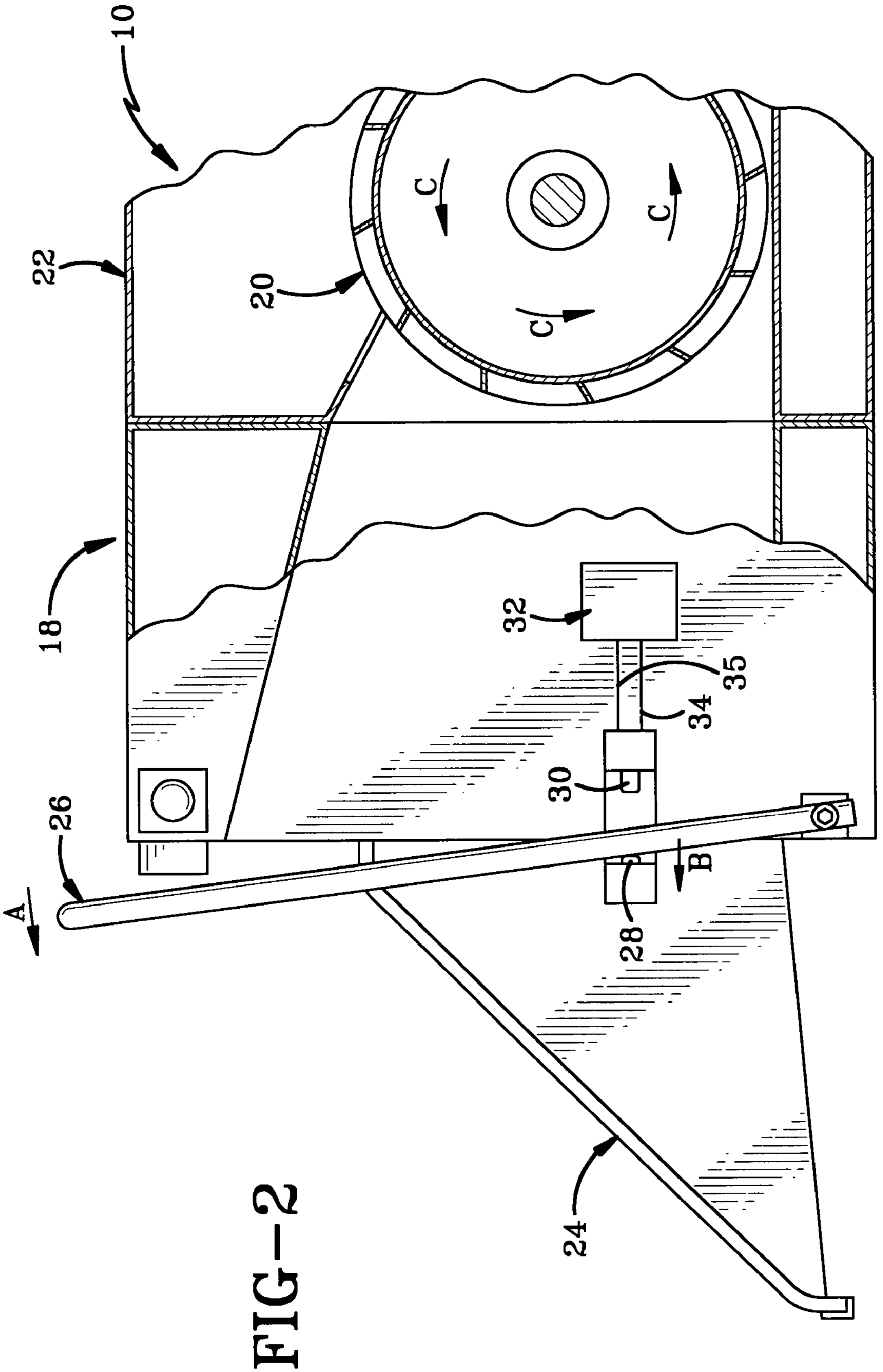
FIG. 2 is a fragmentary side elevational view showing the feed control bar in a forward position with portions cut away showing the feed wheel rotating in the forward direction.

Referring to FIG. 2, feed control bar 26 is moveable as indicated at Arrow A to a forward position so that feed control bar 26 contacts first switch 28 and moves switch 28 as indicated by Arrow B from an open position (FIG. 3) to a closed position. In a general sense, the activation of switch 28 by feed control bar 26 allows feed wheel (20 to rotate in a forward direction as indicated by Arrow C in order that feed material may be drawn into wood chipper 10. However, it is more accurate to say that the activation of switch 28 to the closed position is associated with forward rotation of feed wheel 20, but that ECU 32 via its logic circuit actually controls whether feed wheel 20 will rotate in the forward direction. This is a key feature of the invention which will be detailed further below. In short, activation of switch 28 by feed control bar 26 sends a signal via circuit 34 to ECU 32 so that ECU 32 is able to determine that feed control bar 26 is in the forward position.

Figure 3:
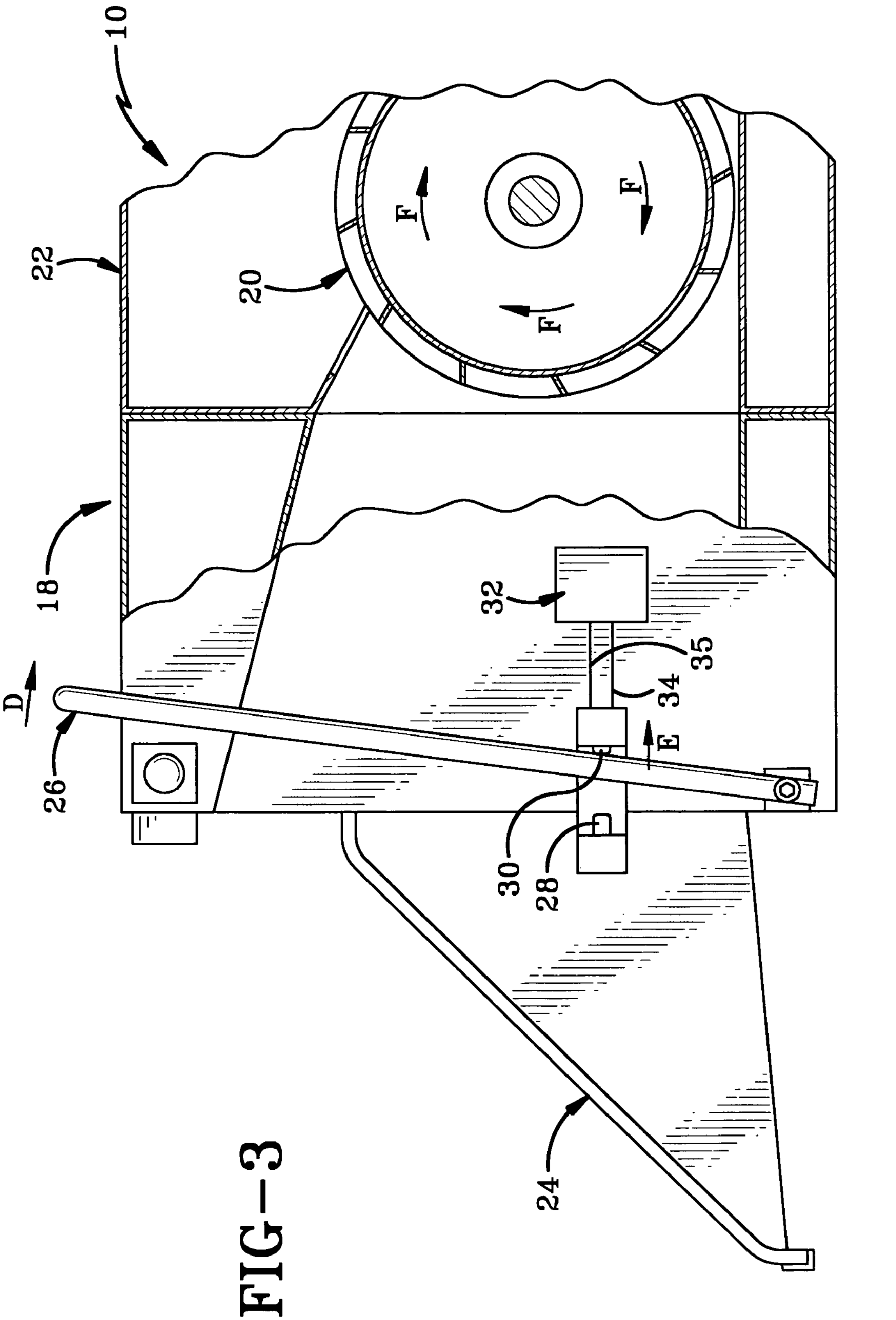
FIG. 3 is similar to FIG. 2 but shows the feed control bar moved to the reverse direction and the feed wheel rotating in the reverse direction.

With reference to FIG. 3, feed control bar 26 is moved as indicated by Arrow D to a reverse position so that feed control bar 26 contacts second switch 30 to move switch 30 as indicated at Arrow E from an open position (FIG. 2) to a closed position. Feed control bar 26 thus activates switch 30 so that feed wheel 20 may rotate in a reverse direction as indicated by Arrows F. However, as described with regard to activation of first switch 28 by feed control bar 26, ECU 32 ultimately controls whether feed wheel 20 will rotate in the reverse direction. Also in a similar fashion, feed control bar 26 activates switch 30 in order to send a signal via circuit 35 to ECU 32 whereby ECU 32 is able to determine that feed control bar 26 is in the reverse position. When feed control bar 26 is in a neutral position (FIG. 1), neither of switches 28 and 30 is activated by bar 26 so that ECU 32 is able to determine that feed control bar 26 is in the neutral position by the fact that switches 28 and 30 are each inactivated.

Figure 4:
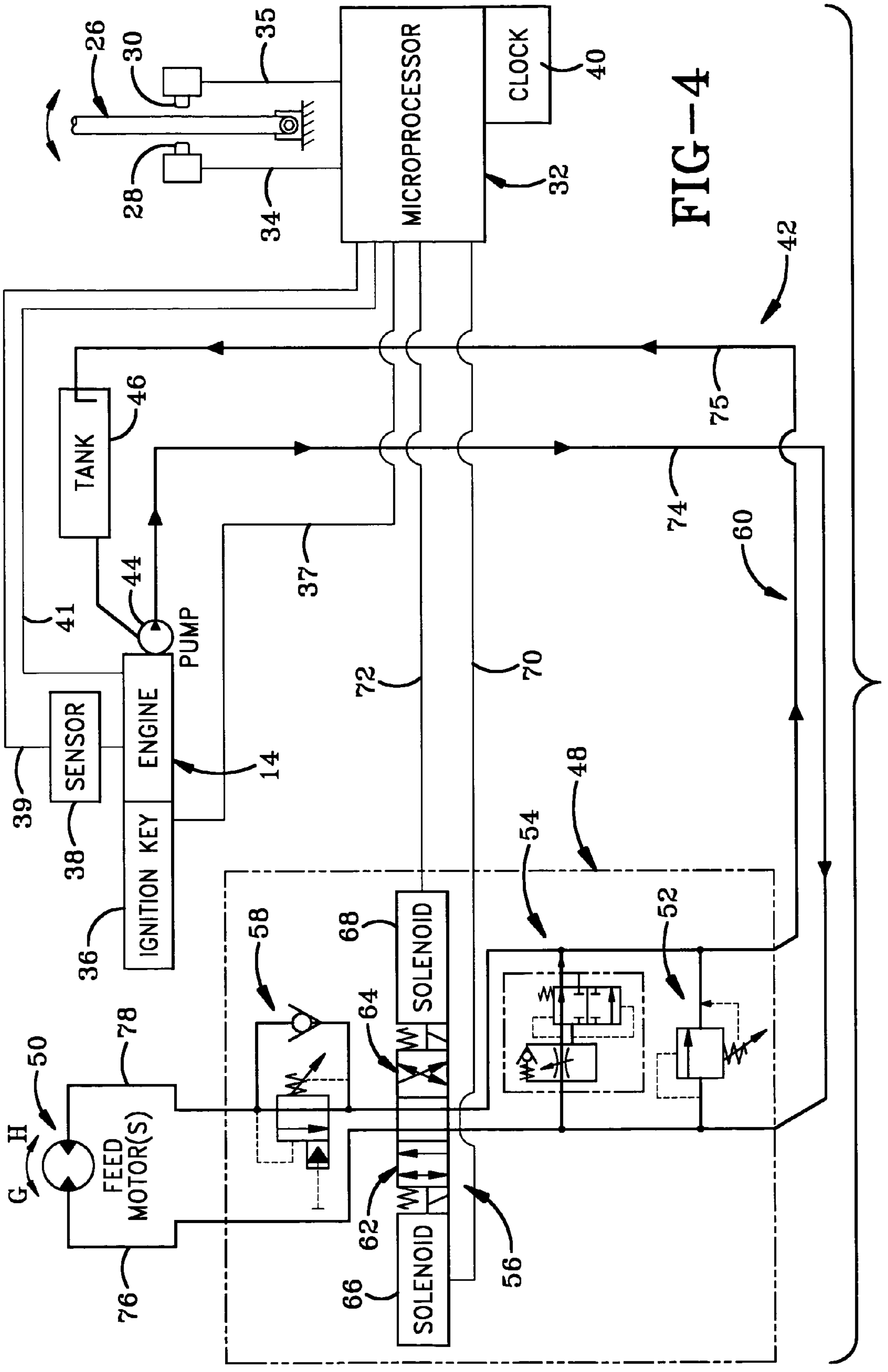
FIG. 4 is a diagrammatic view of the control system of the present invention.

With reference to FIG. 4, the control system of wood chipper 10 is further detailed. An ignition mechanism in the form of an ignition key 36 is operatively connected to engine 14 and is moveable between an off position and a starting position. Ignition mechanism 36 is in electrical communication with ECU 32 via an ignition electrical circuit 37. A sensor 38 for sensing a load on cutting assembly 16 (FIG. 1) is in electrical communication via a sensor electrical circuit 39 with ECU 32, which is shown as a microprocessor in FIG. 4. While sensor 38 may sense this load in a variety of ways, most commonly sensor 38 senses the operational speed of engine 14 so that a reduction in the operational speed of engine 14 indicates an increased load upon cutting assembly 16. Conveniently, sensor 38 may be a tachometer which is typically provided with engine 14. ECU 32 is in electrical communication with engine 14 via an engine electrical circuit 41. The control system further includes a timing device in the form of a clock 40 which is in electrical communication with ECU 32.

The control assembly of wood chipper 10 further includes a hydraulic system 42 which includes a hydraulic pump 44 which is powered by engine 14. Hydraulic system 42 further includes a reservoir or tank 46, a valve block 48 and one or more hydraulic feed motors 50. Valve block 48 includes a relief valve 52, a flow regulator or flow control valve 54, a directional control valve assembly 56 and a counterbalance valve 58. These various elements of the hydraulic system 42 are interconnected by hydraulic lines as generally indicated at 60. Directional control valve assembly 56 includes a first or forward directional control valve 62 and a second or reverse directional control valve 64. A first or forward solenoid 66 is operatively connected to forward directional control valve 62 and a second or reverse solenoid 68 is operatively connected to a reverse directional control valve 64. First solenoid 66 is in electrical communication with microprocessor 32 via a first electrical circuit 70. Likewise, second solenoid 68 is in electrical communication with microprocessor 32 via a second electrical circuit 72.

With continued reference to FIG. 4, the operation of hydraulic system 42 is described. Pump 44 is powered by engine 14 to pump hydraulic fluid through a feed line 74 to valve block 48. Hydraulic fluid is returned from valve block 48 via a return line 75 to tank 46. When first and second directional control valves 62 and 64 are properly configured, hydraulic fluid flows via hydraulic lines 76 and 78 in order to rotate feed motor 50 in either a forward direction as indicated at Arrow G or a reverse direction as indicated at Arrow H to respectively rotate feed wheel 20 in the forward direction (FIG. 2) or the reverse direction (FIG. 3). Relief valve 52 is provided to protect against over pressure within hydraulic system 42. Typically, this occurs when feed wheel 20 grips feed material but cannot pull the feed material into wood chipper 10. Flow control valve 54 is provided to allow some portion of the hydraulic oil to be bypassed to tank 46. Remaining oil is available for the feed wheel circuit, but with a reduced volume and a resulting diminished feed wheel speed. Flow control valve 54 is sometimes utilized by an operator of wood chipper 10 in order to vary the speed at which feed material is fed into wood chipper 10. Counterbalance valve 58 is provided in order to prevent a condition known as "self-feeding". Self-feeding occurs when cutting assembly 16 itself draws feed material into wood chipper 10, which means that the feeding of material is out of control and is dangerous to operators. Self-feeding may also cause cutting assembly 16 to choke itself with too much material and stall. Counterbalance valve 58 serves to retard feed motor 50 in order to prevent this problem.

With continued reference to FIG. 4 and in accordance with a feature of the invention, activated and inactivated positions of valves 62 and 64 to be specified allow microprocessor 32 to control feed motor 50 to rotate in the forward direction, rotate in the reverse direction or to stop and remain stopped as long as desired. More particularly, first directional control valve 62 has an inactivated position and an activated position which allows the flow of hydraulic fluid from feed lines 74 into hydraulic line 76 in order to rotate feed motor 50 in the forward direction indicated by Arrow G. More particularly, solenoid 66 has an activated position which moves valve 62 to its activated position and an inactivated position which moves valve 62 to its inactivated position. To control solenoid 66, ECU 32 sends an electrical signal to activate solenoid 66 to its activated position and terminates the electrical signal so that solenoid 66 moves to the inactivated position. Thus, ECU 32 closes electrical circuit 70 to activate solenoid 66 and opens circuit 70 to inactivate solenoid 66.

Similarly and with continued reference to FIG. 4, second directional control valve 64 is moveable between an inactivated position and an activated position in which hydraulic fluid flows from feed line 74 into hydraulic line 78 in order to rotate feed wheel 50 in the reverse direction indicated by Arrow H. More particularly, solenoid 68 is moveable between an activated position which activates valve 64 to its activated position and an inactivated position which inactivates valve 64 to its inactivated position. ECU 32 controls solenoid 68 in the same manner as solenoid 66. Thus, ECU 32 sends a signal to solenoid 68 by closing electrical circuit 72 in order to activate solenoid 68 and terminates the signal by opening circuit 72 to inactivate solenoid 68. It is noted that first and second control valves 62 and 64 are operated in the alternative. That is, in order to rotate feed motor 50 in the forward direction, ECU 32 activates first solenoid 66 as described while solenoid 68 and second valve 64 remain in or are moved to their respective inactivated positions. To rotate feed motor 50 in the reverse direction, the reverse is true so that ECU 32 activates solenoid 68 while solenoid 66 is inactivated. In order to stop the rotation of feed motor 50 in either direction, ECU 32 opens circuits 70 and 72 so that solenoids 66 and 68 are each inactivated and valves 62 and 64 are likewise inactivated. In this inactivated state of solenoids 66 and 68 and valves 62 and 64, no hydraulic fluid flows through lines 76 and 78 and therefore feed motor 50 is in a non-rotating or non-rotatable state, that is, in neutral.

Thus, in accordance with the invention, ECU 32 is able to control operation of feed motor 50 and engine 14 based on inputs or signals via circuits 34, 35, 37 and 39 as well as inputs from clock 40. Specific advantages of this control are further detailed below.

Figure 5:
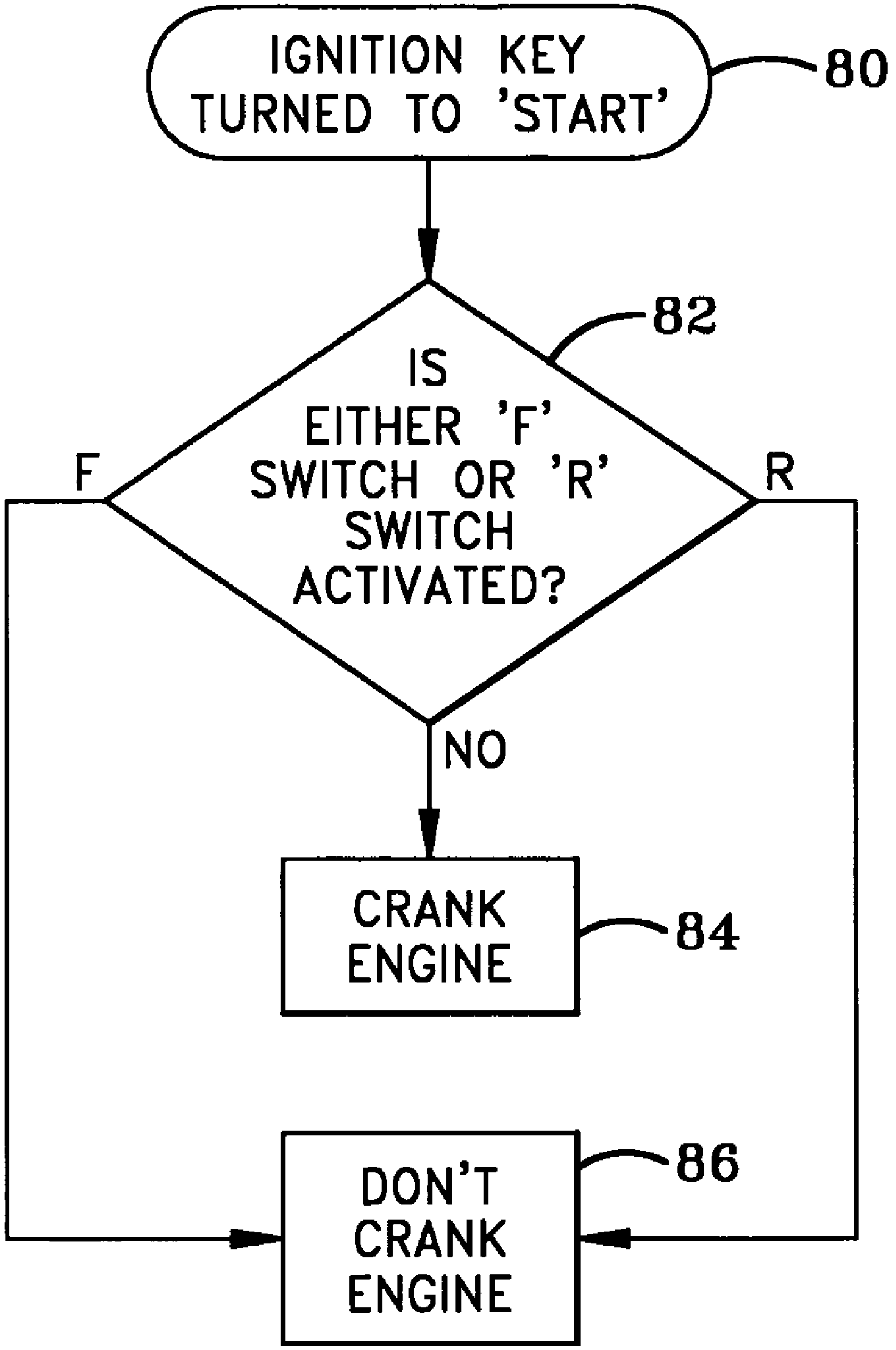
FIG. 5 is a flow chart related to the engine-starting safety mechanism of the present invention.

In accordance with feature of the invention and with reference to FIG. 5, the control system of wood chipper 10 features a safe engine-start procedure and mechanism therefor. More particularly, to start engine 14, ignition mechanism 36 is first placed in a start position as indicated at block 80 in FIG. 5. Placing ignition mechanism or key 36 in the start position sends a signal via circuit 37 (FIG. 4) to ECU 32 to indicate that key 36 is in the start position. ECU 32 then determines whether forward switch 28 or reverse switch 30 is activated, as indicated at block 82 in FIG. 5. If neither one of forward switch 28 or reverse switch 30 is activated, then ECU 32 will allow the engine to be cranked as indicated at block 84. However, if either one of switches 28 and 30 is activated, ECU 32 will not allow the engine to be started, as indicated at block 86. Thus, as long as feed control bar 26 is in its neutral position and thus switches 28 and 30 are inactivated and circuits 34 and 35 are open, engine 14 may be started without an associated rotation of feed motor 50 and feed wheel 20. However, if feed control bar 26 is in either the forward or reverse positions and thus is activating either switch 28 or 30, ECU 32 will not allow engine 14 to be started. Thus, the control system of chipper 10 prevents the dangerous situation of having feed wheel 20 rotate upon the starting of engine 14.

Figure 6:
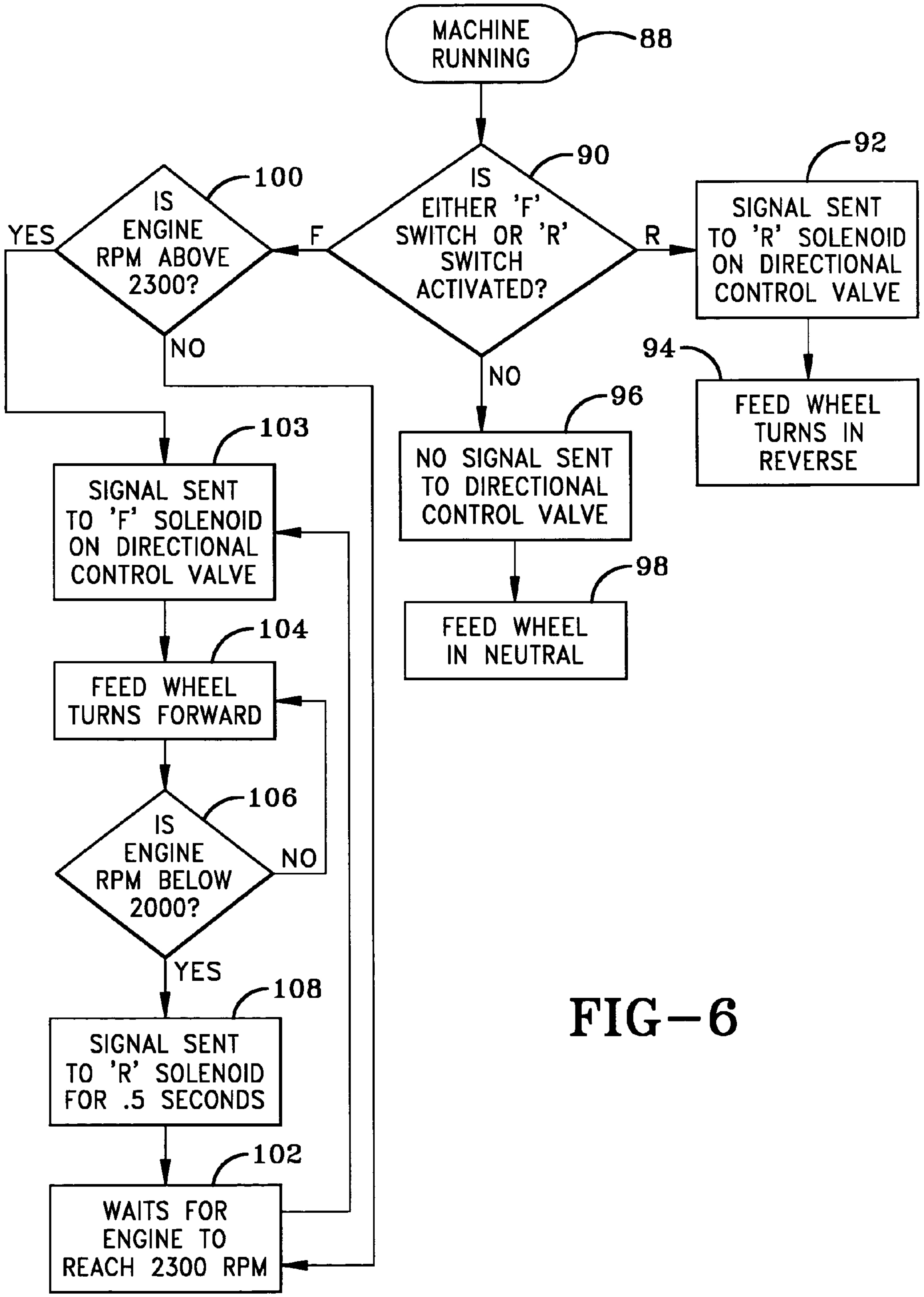
FIG. 6 is a flow chart related to a first embodiment of the feed control mechanism of the present invention.

In accordance with another feature of the invention and with reference to FIG. 6, the control system of wood chipper 10 permits the control of feed wheel 20 in response to an increased load on the cutting assembly 16 or engine 14 in order to allow engine 14 to operate at an optimum operational speed, to prevent the stalling of engine 14 and to reduce maintenance procedures when such stalling occurs. More particularly, once wood chipper 10 is running as indicated at block 88 in FIG. 6, ECU 32 determines as previously described whether either the forward switch 28 or reverse switch 30 is activated, as indicated at block 90. If reverse switch 30 is activated, ECU 32 signals reverse solenoid 68, as indicated at block 92, to activate reverse directional control valve 64 in order to rotate feed motor 50 and feed wheel 20 in the reverse direction as indicated at block 94. The reverse rotation should occur immediately upon activation of reverse switch 30 in order to preserve this safety feature which is important to prevent injury to an operator. If neither the forward switch 28 or reverse switch 30 is activated, then no signal is sent by ECU 32 to either of direction control valves 62 or 64 as indicated at block 96 so that feed wheel 20 remains in a non-rotating state or in neutral, as indicated at block 98. More particularly, ECU 32 sends no signal to either solenoid 66 or 68 so that valves 62 and 64 remain inactivated.

If forward switch 28 is activated, then ECU 32 determines whether engine 14 has an operational speed or RPM above a first predetermined value, as indicated at block 100. More particularly, sensor 38 sends a signal via circuit 39 to ECU 32 so that ECU 32 may make this determination. If the operational speed of engine 14 is not above the first value, then ECU 32 waits until engine 14 has reached the first value, as indicated at block 102, before taking any further action. Once engine 14 has an operational speed above the first value, ECU 32 signals the forward solenoid 66 on the forward directional control valve 62 as indicated at block 103 to activate solenoid 66 and valve 62 to rotate feed wheel 20 in the forward direction as indicated at block 104. Wood chipper 10 is then ready for feeding material via feed wheel 20 to be cut by cutter assembly 16. As wood chipper 10 continues to operate, ECU 32 will monitor the operational speed of engine 14 via sensor 38 to determine whether the engine operational speed falls below a second predetermined value as indicated at block 106. If not, feed wheel 20 will continue to rotate in the forward direction as indicated at block 104. However, if the operational speed does fall below the second value as indicated in block 106, ECU 32 will signal the reverse solenoid 68 for a predetermined period of time, such as one-half second, as indicated at block 108 in order to rotate feed motor 50 and feed wheel 20 in the reverse direction for this specified period of time. This reverse rotation of feed wheel 20 allows for the feed material which has created an increased load upon engine 14 to be moved away from cutting assembly 16 in order to prevent stalling of engine 14 and to allow engine 14 to return to a desired operational speed. Thus, as indicated at block 102, ECU 32 will then wait until engine 14 reaches the first value and then signal forward solenoid 66 as indicated at block 103 in order to turn feed wheel 20 as indicated at block 104. ECU 32 continuously monitors these various conditions in order to ensure that engine 14 does not stall and runs at an optimal operational speed. Thus, the procedure detailed with reference to FIG. 6 allows for feed wheel 20 to operate in a reverse direction for a typically brief period of time and then stop altogether for whatever period of time is necessary to allow engine 14 to return to its desired operational speed before rotating feed wheel 20 in the forward direction to feed material into cutting assembly 16. Thus, when the period of time that feed wheel 20 is operated in the reverse direction as indicated at block 108 is not sufficient to allow engine 14 to return to its desired operational speed, the waiting indicated at block 102 is more particularly achieved by ECU 32 eliminating any signal to reverse solenoid 68 or forward solenoid 66 so that feed motor 50 and feed wheel 20 are in neutral and thus non-rotating or stopped.

Figure 7:
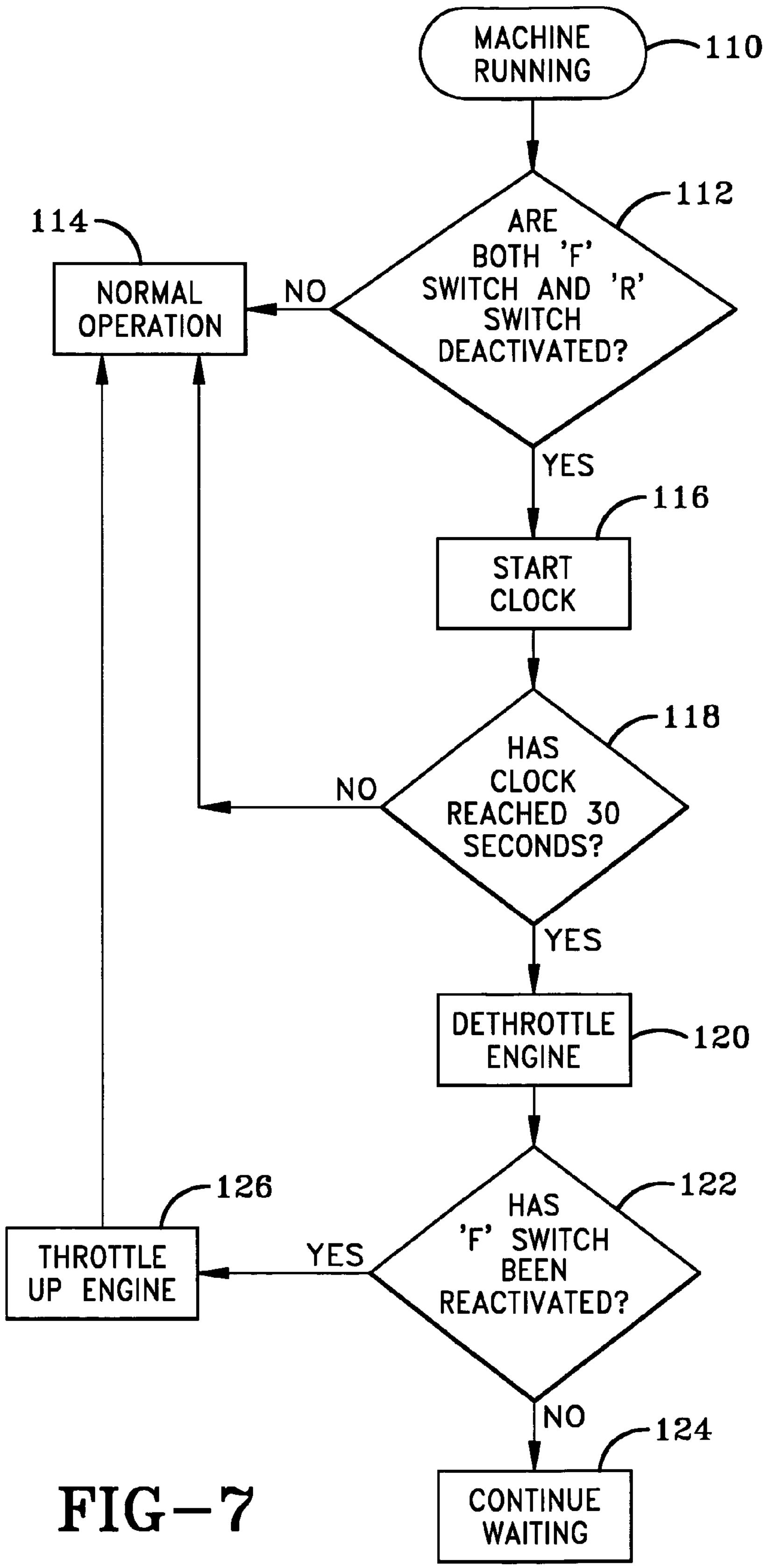
FIG. 7 is a flow chart related to the fuel-saving mechanism of the present invention.

In accordance with another feature of the invention and with reference to FIG. 7, the control system of wood chipper 10 further provides for a fuel-saving mechanism. More particularly, once engine 14 is running as indicated at block 110 of FIG. 7, ECU 32 will determine if both of switches 28 and 30 are deactivated or in an inactivated state as indicated at block 112. If not, wood chipper 10 continues normal operation as indicated at block 114. However, if both of forward switch 28 and reverse switch 30 are inactivated, clock 40 will be started as indicated at block 116 in order to track how long engine 14 is running at an operational speed with feed control bar 26 and feed wheel 20 in neutral positions, thus indicating that no material is being fed into wood chipper 10. As indicated at block 118, ECU 30 will then determine whether a predetermined amount of time has passed since switches 28 and 30 have been deactivated. If the predetermined amount of time has not been reached, normal operation continues as indicated at block 114. If the predetermined amount of time has been reached, ECU 32 will signal engine 14 via circuit 41 to de-throttle engine 14 as indicated at block 120. Typically, the operational speed of engine 14 will be decreased to an idle speed.

ECU 32 will continue to monitor and in particular determine if forward switch 28 has been reactivated as indicated at block 122. If not, ECU 32 continues to wait as indicated at block 124 wherein engine 14 remains at the reduced operational speed. If forward switch 28 has been reactivated, ECU 32 will control engine 14 via circuit 41 in order to throttle up or increase the operational speed of engine 14 as indicated at block 126 whereupon engine 14 resumes normal operation as indicated at block 114. Thus, the control system of wood chipper 10 allows engine 14 to be run at an idling speed or other decreased operational speed when material has not been fed into wood chipper 10 for a predetermined period of time, thus providing the fuel-saving mechanism.

Figure 8:
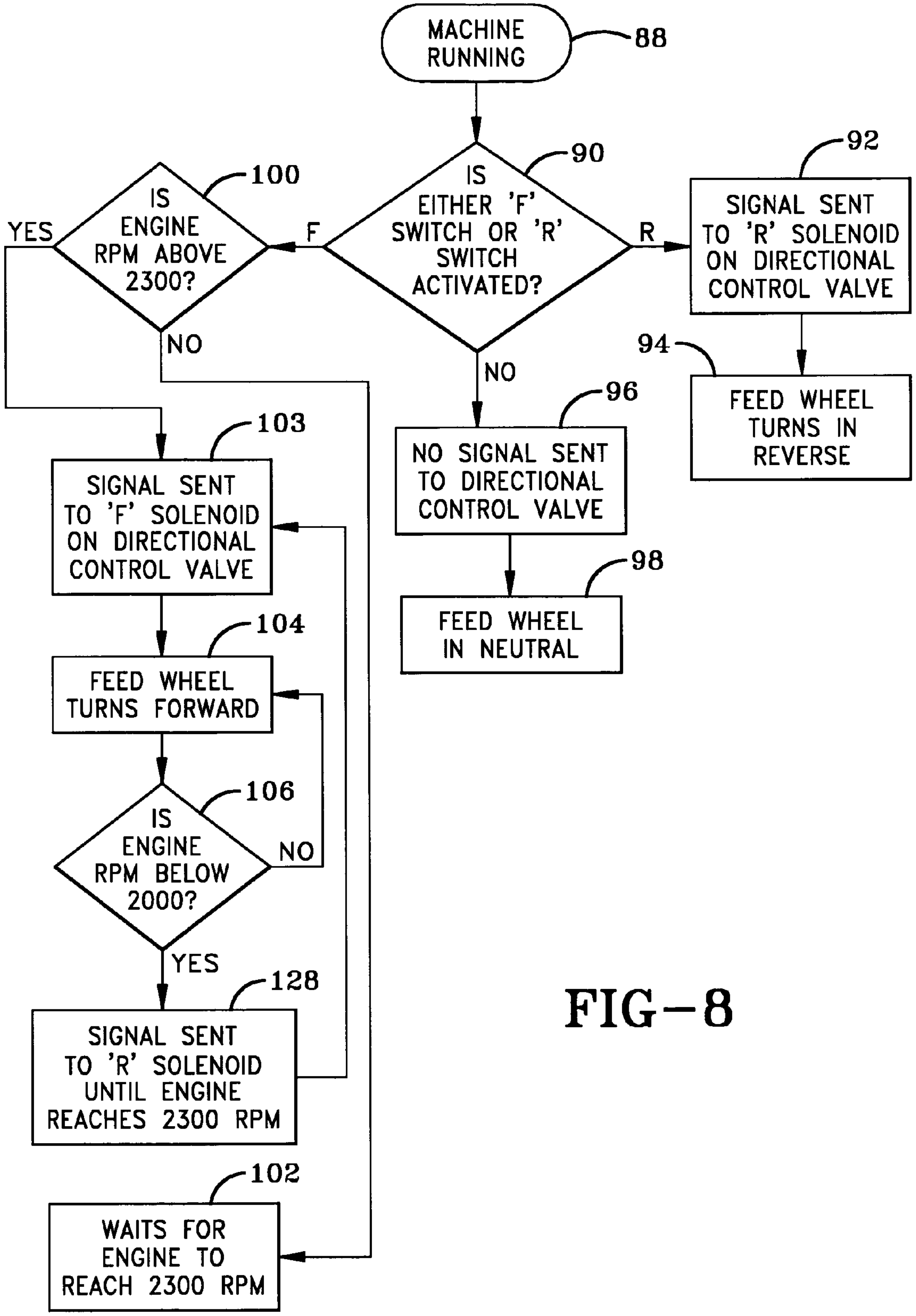
FIG. 8 is a flow chart of a second embodiment of the feed control mechanism of the present invention.

With reference to FIG. 8, a second embodiment of the method of controlling feed wheel 20 in response to an increased load on cutting assembly 16 or engine 14 is described. Many aspects of this second embodiment shown in FIG. 8 are the same as that shown in FIG. 6 and thus similar blocks are numbered similarly. Indeed, the procedure with reference to FIG. 8 is the same as that as described with regard to FIG. 6 concerning blocks 88, 90, 92, 94, 96, 98, 100, 103, 104 and 106. Therefore, this procedure is not reiterated. However, the second embodiment changes with respect to what occurs when it is found that engine 14 has dropped below the second predetermined value indicated at block 106. If the engine operational speed has dropped below the second value, ECU 32 signals reverse solenoid 68 continuously until engine 14 reaches the higher first value indicated at block 128 whereby ECU 32 signals the forward solenoid 66 as indicated at block 103 so that feed wheel 20 stops rotating in the reverse direction and begins rotating in the forward direction. Thus, in contrast to the first embodiment discussed with reference to FIG. 6, the second embodiment does not rotate the feed wheel 20 in the reverse direction for a predetermined period of time, but rather until the engine operational speed increases to the second predetermined higher value.

Figure 9:
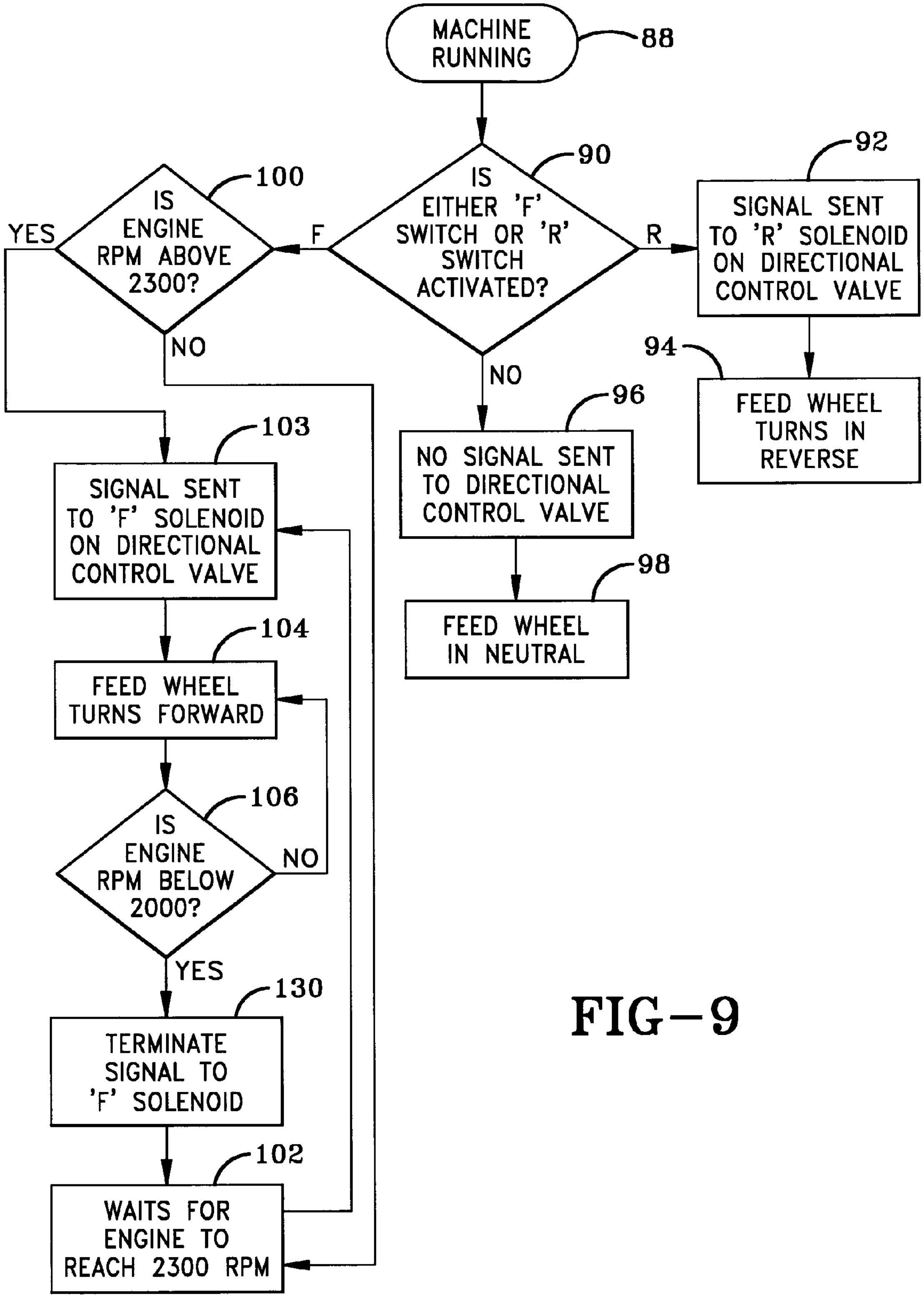
FIG. 9 is a flow chart related to a third embodiment of the feed control mechanism of the present invention.

With reference to FIG. 9, a third embodiment of the control system of wood chipper 10 is described. This third embodiment is similar to the first and second embodiments described with reference to FIGS. 6 and 8. More particularly, the third embodiment shown in FIG. 9 is similar to the first embodiment described with reference to FIG. 6 to the same degree that the second embodiment of FIG. 8 is similar to FIG. 6. The third embodiment of FIG. 9 then varies with regard to what occurs when ECU 32 determines that the operational speed of engine 14 is below the second lower value as indicated at block 106. When the engine RPM falls below the second value, ECU 32 terminates the signal to forward solenoid 66 as indicated at block 130 so that solenoids 66 and 68 are both deactivated and feed motor 50 and feed wheel 20 are in non-rotating or neutral states. Thus, feed wheel 20 is simply stopped while ECU 32 waits for the engine to reach the higher operational speed as indicated at block 102.

Thus, the third embodiment control system is capable of stopping rotation of the feed wheel until the engine operational speed reaches the desired level; the second embodiment control system is capable of reversing rotation of the feed wheel continuously until the desired operational speed is resumed; and the first embodiment control system is capable of reversing rotation of the feed wheel for a predetermined time and then stopping rotation of the feed wheel if needed until the engine returns to the higher predetermined value.

Thus, wood chipper 10 provides an improved control system providing a variety of functions for controlling the feed wheel and the engine.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method comprising the steps of:

sensing via at least one electric switch a position of a feed control bar of a wood chipper;

controlling with an electronic control unit (ECU) in light of the position of the feed control bar one of rotational movement of a feed wheel of the wood chipper and operation of an engine which selectively powers the wood chipper;

sensing an increased load upon the engine;

sending to the ECU a signal indicating the increased load; and wherein the step of controlling includes the step of stopping rotation of the feed wheel in response to the increased load; and, wherein the step of stopping includes the step of maintaining the feed wheel in a stopped state until operational speed of the engine has increased to a predetermined value.

2. A method comprising the steps of:

sensing via at least one electric switch a position of a feed control bar of a wood chipper;

controlling with an electronic control unit (ECU) in light of the position of the feed control bar one of rotational movement of a feed wheel of the wood chipper and operation of an engine which selectively powers the wood chipper;

sensing an increased load upon the engine;

sending to the ECU a signal indicating the increased load, wherein the step of controlling includes the step of reversing rotation of the feed wheel in response to the increased load, and the step of reversing includes the step of reversing rotation of the feed wheel for a predetermined period of time; and, wherein the step of controlling includes the step of stopping rotation of the feed wheel subsequent to the step of reversing for an additional period of time sufficient to allow an operational speed of the engine to increase to a predetermined value.

3. A method comprising the steps of:

sensing via at least one electric switch a position of a feed control bar of a wood chipper; and, controlling with an electronic control unit (ECU) in light of the position of the feed control bar one of rotational movement of a feed wheel of the wood chipper and operation of an engine which selectively powers the wood chipper, wherein the step of controlling includes the step of decreasing automatically an operating speed of the engine after the engine has operated continuously with the feed wheel in a non-rotating state for a predetermined of time.

4. The method of claim 3 further including the step of moving the feed control bar to a position associated with forward rotation of the feed wheel; and wherein the step of controlling includes the step of allowing forward rotation of the feed wheel in response to the step of moving only after increasing the engine operating speed to a predetermined value.

5. A method comprising the steps of:

sensing via at least one electric switch a position of a feed control bar of a wood chipper; and, controlling with an electronic control unit (ECU) in light of the position of the feed control bar one of rotational movement of a feed wheel of the wood chipper and operation of an engine which selectively powers the wood chipper, wherein the step of controlling includes the step of allowing the engine to start only when the feed wheel is in a neutral state.

6. The method of claim 5 wherein the step of sensing includes the step of sensing whether first and second electric switches are activated wherein non-activation of the first and second switches is indicative of the neutral state of the feed wheel; and wherein the step of allowing includes the step of allowing the engine to start only when the first and second switches are not activated.

7. The method of claim 5 further including the steps of placing an ignition mechanism in a start position associated with starting the engine; and sending a signal to the ECU indicating that the ignition mechanism is in the start position; wherein the step of sensing includes the step of sensing whether the feed wheel is in the neutral state; and wherein the step of allowing includes the step of signaling the engine with the ECU to start if the feed wheel is in the neutral state.

8. A method comprising the steps of:

sensing via at least one electric switch a position of a feed control bar of a wood chipper;

controlling with an electronic control unit (ECU) in light of the position of the feed control bar one of rotational movement of a feed wheel of the wood chipper and operation of an engine which selectively powers the wood chipper; and, moving the feed control bar to a forward position to activate a forward electric switch to signal the ECU that the feed control bar is in the forward position; and wherein the step of controlling includes the step of allowing forward rotation of the feed wheel only if the engine has a predetermined operational speed.

9. A method comprising the steps of:

sensing via at least one electric switch a position of a feed control bar of a wood chipper; and, controlling with an electronic control unit (ECU) in light of the position of the feed control bar one of rotational movement of a feed wheel of the wood chipper and operation of an engine which selectively powers the wood chipper, wherein the step of controlling includes the step of maintaining the feed wheel in a stopped state while the feed control bar is in a forward position.

10. The method of claim 1 wherein the step of sensing includes the step of sensing the position of the feed control bar based on whether first and second electrical switches are respectively activated or inactivated.

* * * * *